United States Patent [19]
Hoch et al.

[11] Patent Number: 5,136,899
[45] Date of Patent: Aug. 11, 1992

[54] ACCELERATOR PEDAL AND BRAKE MECHANISM

[75] Inventors: John J. Hoch, Columbus; James E. Hardzinski, Horicon, both of Wis.

[73] Assignee: Deere & Company, Moline, Ill.

[21] Appl. No.: 471,294

[22] Filed: Jan. 26, 1990

[51] Int. Cl.⁵ .................. B60K 41/00; G05G 1/14
[52] U.S. Cl. ........................ 74/878; 192/0.09; 74/560; 74/562; 74/512; 74/513; 180/335; 180/336
[58] Field of Search .............. 74/864, 878, 560, 561, 74/562, 562.5, 512, 513; 192/0.09; 180/335, 336, 315

[56] References Cited

U.S. PATENT DOCUMENTS

| | | | |
|---|---|---|---|
| 2,175,772 | 10/1939 | Gintling | 74/562.5 |
| 2,248,747 | 7/1941 | Dick | 74/878 |
| 2,493,592 | 1/1950 | Peabody | 74/878 |
| 3,392,605 | 7/1968 | McLean | 74/878 |
| 3,418,872 | 12/1968 | Vernati | 74/878 |
| 3,461,669 | 8/1969 | Kanengieter | 180/307 |
| 3,777,585 | 12/1973 | Plamper | 74/230.17 D |
| 4,176,560 | 12/1979 | Clake | 74/230.17 A |
| 4,759,417 | 7/1988 | Wanie et al. | 180/6.34 |
| 4,771,856 | 9/1988 | Hutchison et al. | 180/333 |

Primary Examiner—Charles A. Marmor
Assistant Examiner—Karin Tyson

[57] ABSTRACT

A vehicle which has a foot actuated speed control and linkage, a hand actuated control for selecting the forward or reverse mode, a brake pedal and linkage, and a mechanism connecting the speed control linkage and the mode control. The connecting mechanism comprises a rod coupled to an idler arm of the speed control linkage and a swingable connecting arm. The arm comes in contact with a selection arm of the mode control linkage to prevent the mode from being shifted when the speed control is depressed, and to limit the speed in reverse. A stop rod swings down over an arm of the speed control linkage as a parking brake is applied to block the movement of the speed control.

16 Claims, 6 Drawing Sheets

ACCELERATOR PEDAL AND BRAKE MECHANISM

BACKGROUND OF THE INVENTION

1. Field of the Invention

The invention relates to an accelerator pedal and brake system for use in vehicles such as rider mowers.

2. Description of the Prior Art

Many conventional belt-driven rider mowers provide driving controls that include a hand actuated lever for selecting the forward or reverse mode, a hand actuated lever for selecting the speed of travel, and a foot actuated clutch pedal which acts to override the speed select lever. The operator begins the mowing operation by starting the mower's engine while the speed select lever is in a neutral or non-driven mode. The operator then initiates forward progress in one of two ways. First, he may slowly shift the speed select lever to a desired speed without depressing the clutch pedal. As the operator shifts the speed control lever a linkage connected to the speed control lever causes an idler arm to swing an idler pulley into a belt, thus causing a variator pulley to be adjusted, as generally described in U.S. Pat. No. 4,771,856. The adjustment of the variator pulley increases the rate at which power is transmitted to the driven wheels, thus increasing the vehicles ground speed. Secondly, the operator can move the speed select lever to a desired setting while depressing the clutch pedal, and then gradually release the clutch pedal to cause the vehicle to assume the desired speed selected by the speed select lever. The clutch pedal is connected via a linkage to the idler arm such that when the clutch pedal is depressed the variator pulley will assume a non-driven mode, regardless of the position of the speed select lever. Some mowers utilize a lost motion coupling between the clutch pedal linkage and the idler arm that allows the clutch pedal to override the speed select lever. As the speed select lever is shifted from a neutral to a driven position when the operator is depressing the clutch pedal, the vehicle remains non-driven. When the operator releases the clutch pedal the variator pulley is allowed to assume the position corresponding to the position of the speed select lever.

Once the desired speed has been attained, the vehicle may be slowed or stopped in a number of ways. The operator may shift the speed select lever to a slower or non-driven setting. The operator may also depress the clutch pedal to slow the mower. When the operator wishes to again increase speed to the predetermined level he releases the clutch pedal and the vehicle resumes the rate of travel corresponding to the position of the speed control lever. Finally, the operator may slow or stop the mower by depressing a brake pedal. Some mowers of this type provide a tab connected with the brake pedal behind and in confronting relation with a tab connected with the clutch pedal. As the operator depresses the brake pedal the brake pedal tab engages the clutch pedal tab, which causes the clutch pedal to be actuated automatically as the operator depresses the brake pedal. These vehicles thereby assume a non-driven mode when the operator engages the brake pedal to stop or slow the vehicle.

Some of these mowers are provided with a parking brake feature. To apply the parking brake the operator depresses the brake pedal fully and shifts a parking brake lever that acts to maintain the brake pedal in its engaged position. When the parking brake is being used the tabs between the brake pedal and the clutch pedal act to keep the clutch pedal depressed such that the operator can not unintentionally drive the vehicle when its parking brake is applied. This prevents the vehicle, and particularly the brake mechanism, from being damaged by driving the vehicle when the parking brake is applied.

This type of conventional mower allows for normal mowing operation without requiring the operator to manipulate any controls unless he desires to stop mowing or slow the vehicle when mowing around obstacles. Therefore, these vehicles do not provide for an operator presence feature that automatically stops the vehicle when the operator has left the mower. Many of these vehicles allow the operator to shift between the forward and reverse modes while in a driving mode, which can cause damage to the vehicle. These vehicles generally make no provision for the speed to be limited while in the reverse mode. Also, the pedal and lever configuration may not be familiar to the average person and may require a certain level of operator expertise. The pedals and levers permit the operator to change the speed of the mower by moving the hand actuated lever without depressing the foot actuated clutch pedal. This method of varying the speed can be difficult and can cause the mower to lurch or jerk as the lever is moved abruptly.

Another type of conventional rider mower utilizes an accelerator pedal to select a desired speed for the vehicle. These mowers also include a brake pedal to slow or stop the vehicle and a hand actuated lever that selects the mower's forward or reverse mode. Many of these mowers allow the operator to shift between the forward and reverse modes while the vehicle is being driven, which can cause wear to the vehicle. Many of these mowers allow the vehicles to be driven in reverse at a rate equal to its rate of travel in the forward mode. It is known to provide such mowers with a parking brake, but many such mowers allow the accelerator pedal to be depressed while the parking brake is engaged. This allows the vehicle to be driven with the parking brake on, which may eventually damage the vehicle.

Many of these vehicles provide an accelerator pedal comprised of a flat surface on which the operators foot rides. These pedal surfaces, much like an automobile's pedals, are generally larger than the brake pedal surfaces so that the operator can easily differentiate between the two. To manipulate the accelerator pedal, the operator must bend his ankle through an arc corresponding to the arc through which the pedal surface travels. In many cases, this arc is so great that the operator must bend his ankle to an uncomfortable degree or lift his heel from the operator station floor when the pedal nears either of its extreme positions. When the operator lifts his heel the speed of the mower can be difficult to regulate and the operator can become fatigued easily. Some pedals travel through a smaller arc in an attempt to eliminate the extreme angles that the ankle must accommodate, but because of this smaller arc it is more difficult to finely adjust the vehicle speed.

Another type of rider mower provides for two accelerator pedals: one for the forward direction and the other for the reverse direction. The operator begins by starting the engine, and initiates forward movement by depressing the forward accelerator pedal with his foot. The operator depresses the pedal to a point corresponding to a desired speed, and the operator must continue to depress the pedal to maintain that speed. An operator presence feature is thereby provided since the vehicle will come to a stop after the accelerator pedal is released. When the operator wishes to back up the vehicle he must remove his foot from the forward pedal to depress the reverse accelerator pedal. The operator is thereby prevented from shifting from the forward to the reverse mode while the mower is being driven, since the wheels are not being driven when the operator lifts his foot from the forward pedal to the reverse pedal. The reverse speed can be limited in this type of mower by restricting the range of motion of the reverse accelerator pedal. Parking brakes have been provided on this type of mower, and have provided mechanisms for preventing the mower from being driven while the parking brake is engaged. A mower having this type of pedal arrangement is unfamiliar to many first time users and requires a certain level of operator expertise.

Another type of rider mower provides an accelerator pedal that causes the vehicle to be propelled forward when the operator depresses the forward end or toe of the pedal, and propels the mower in the reverse direction when the operator depresses the rear end or heel of the pedal. Mowers of this type may also be unfamiliar to first time users and require a threshold level of operator expertise. This type of pedal arrangement can also be difficult to operate over rough terrain since the operator must hold his leg above the floor of the operator station with his foot positioned on the movable pedal. The operator therefore lacks the stability that would be available if he were able to keep part of his foot on the floor of the operator station.

SUMMARY OF THE INVENTION

It is therefore desirable to provide a vehicle as used for mowing vegetation that provides an operator presence feature, that prevents the operator from shifting the vehicle between forward and reverse modes when the vehicle wheels are being driven, and one in which the speed is limited when in reverse mode. It would be desirable to provide such a mower with controls that are familiar to the general public, such as those encountered in the operation of automobiles having automatic transmissions. The level of operator expertise required to operate the vehicle would thereby be minimized. It would be desirable to provide such a mower with a mechanism that prevents the vehicle from being driven when the parking brake is engaged. It would also be desirable to provide such a mower with an accelerator pedal that is comfortable for the operator to manipulate through its entire range of rotation.

In the preferred embodiment of the present invention a vehicle is provided for use in the mowing of vegetation that includes a foot actuated accelerator pedal and linkage that adjusts the rate that power is transferred to the drive wheels via a variator pulley drive mechanism. A hand actuated selection lever and linkage is provided that selects the forward or reverse mode of the transmission. An interlock mechanism is provided between the accelerator linkage and the selection lever linkage that prevents the selection lever from being shifted between modes when the operator is depressing the accelerator pedal with his foot. The interlock mechanism also acts to limit the velocity of the vehicle when in the reverse mode. The interlock mechanism of the preferred embodiment comprises an interlock rod connected with the accelerator linkage and a swingable interlock pawl. The interlock rod causes the pawl to swing as the accelerator pedal is depressed. A selection arm contained in the shift control linkage restricts the range of motion of the interlock pawl when the shift lever has selected the reverse mode, thereby limiting the vehicle's velocity in reverse. A stop rod is also provided in the preferred embodiment that rides on a cam fixed to the brake pedal. As the brake pedal is depressed to engage the parking brake the cam rotates with the pedal and the stop rod swings downwardly due to the force of a spring. When in this downward position corresponding to the brake pedal being depressed the stop rod prevents an arm of the accelerator pedal linkage from shifting to a driving position. The stop rod thereby prevents the accelerator pedal from being inadvertently depressed when the parking brake is engaged. The accelerator of the preferred embodiment has an upper portion that is engaged by the ball of the operator's foot as he initially engages the pedal. The lower portion of the pedal forms an angle to the upper portion such that the middle or lower part of the operator's foot engages the lower portion of the pedal as the operator depresses the pedal further.

Related subject matter is found in U.S. application Ser. No. 07/254,768, filed Sep. 17, 1988, which is assigned to the assignee of the present application.

BRIEF DESCRIPTION OF THE DRAWINGS

FIG. 4 does not show the stop rod.

FIG. 5 does not show the stop rod.

FIG. 6 does not show the stop rod.

DETAILED DESCRIPTION OF THE PREFERRED EMBODIMENT

Figure 1:
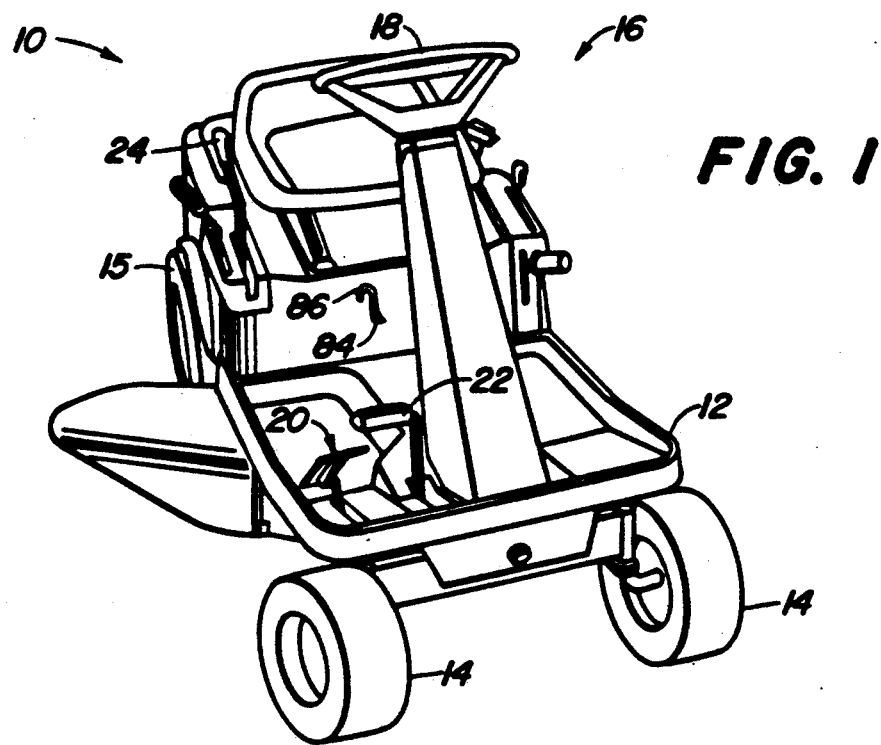
FIG. 1 is a perspective view of a riding mower embodying the present invention.
Figure 7:
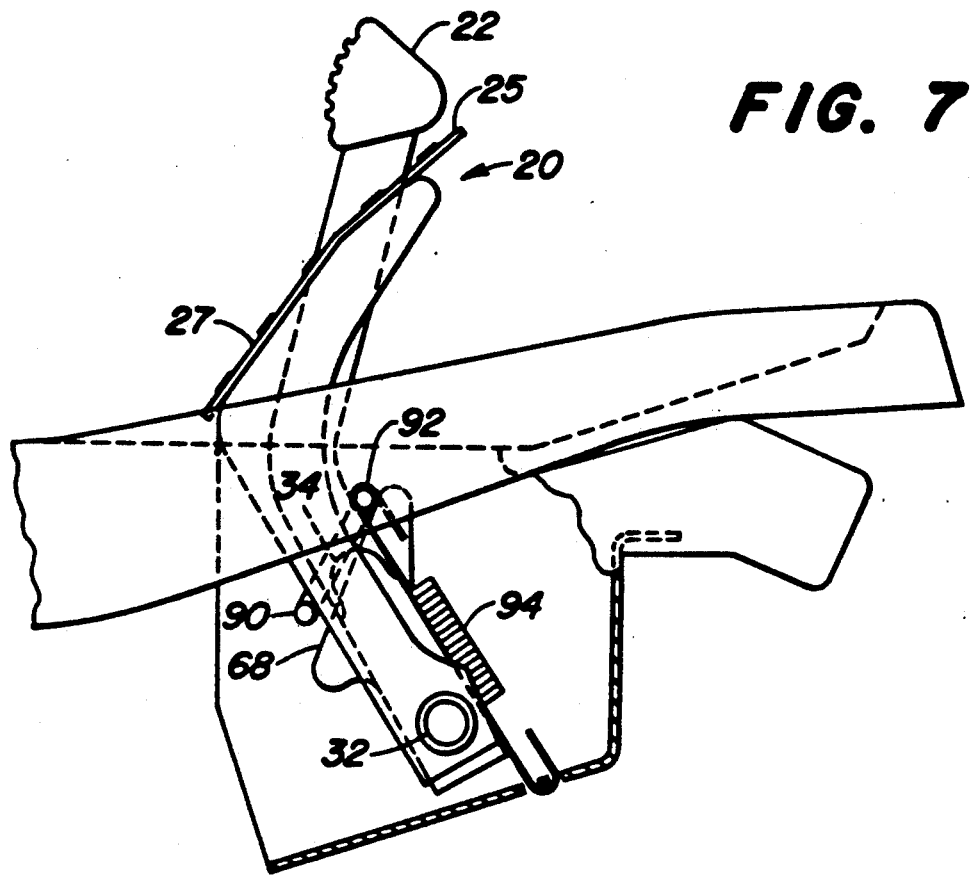
FIG. 7 is a side view of the preferred accelerator pedal configuration, the brake pedal and stop rod when the parking brake is not engaged.
Figure 8:
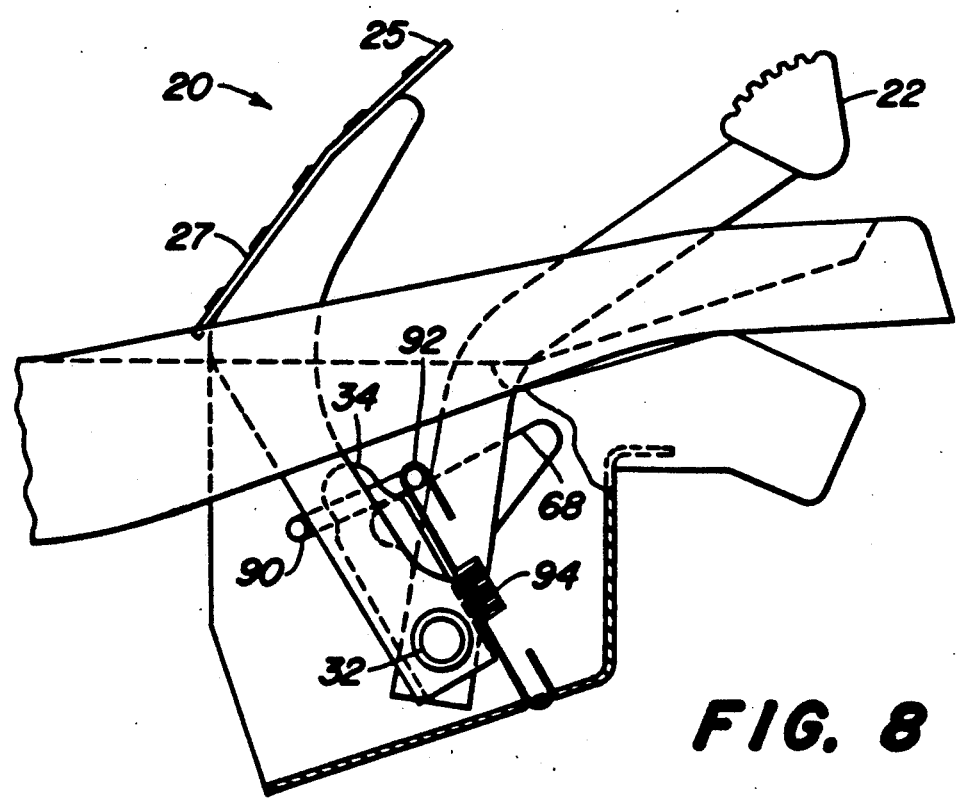
FIG. 8 is a side view of the pedals illustrated in FIG. 7 and the stop rod when the parking brake is engaged.
Figure 9:
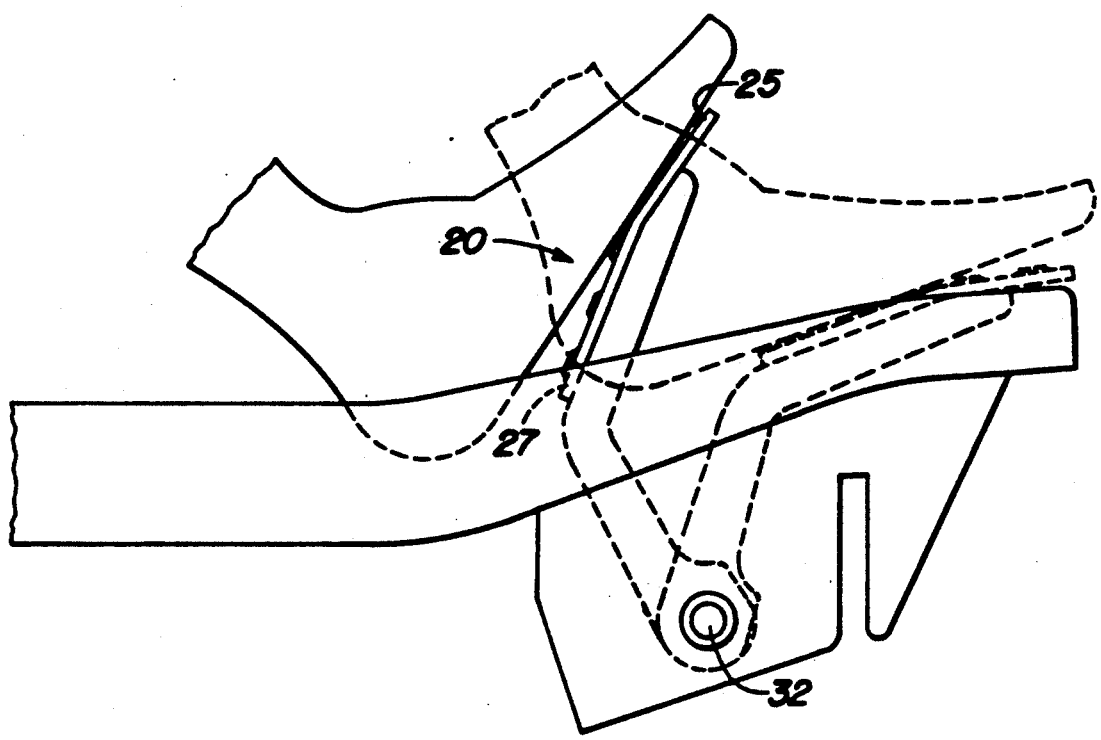
FIG. 9 is a side view of the accelerator pedal showing its depressed position and its released position in solid lines and its depressed position in phantom.

Referring to FIG. 1, a vehicle 10 is provided for use in the mowing of grass. The vehicle 10 has a frame 12, ground engaging wheels 14, 15, and an operator station 16. The operator station 16 includes a steering wheel 18, a foot actuated accelerator pedal 20, a foot actuated brake pedal 22, and a hand actuated forward-reverse direction control lever 24. As FIGS. 7, 8 and 9 show, the accelerator pedal 20 has an upper portion 25 that forms an angle with the rear portion 27 of the pedal. The frame 12 carries a power source, shown schematically as P in FIGS. 4-6, such as a motor or engine. The power source P transmits power to driven pulley 21 and then to the rear wheels in the preferred embodiment via a variator belt drive mechanism and transmission as generally described in U.S. Pat. No. 4,771,856, which patent is assigned to the assignee of the present application and the disclosure of which is herein incorporated by reference.

To adjust the speed of the vehicle an idler pulley 26 (see FIG. 4) is mounted on a swingable idler arm 28 to selectively place tension on a belt 30 that acts to adjust a variator pulley as the pedal is depressed.

Figure 4:
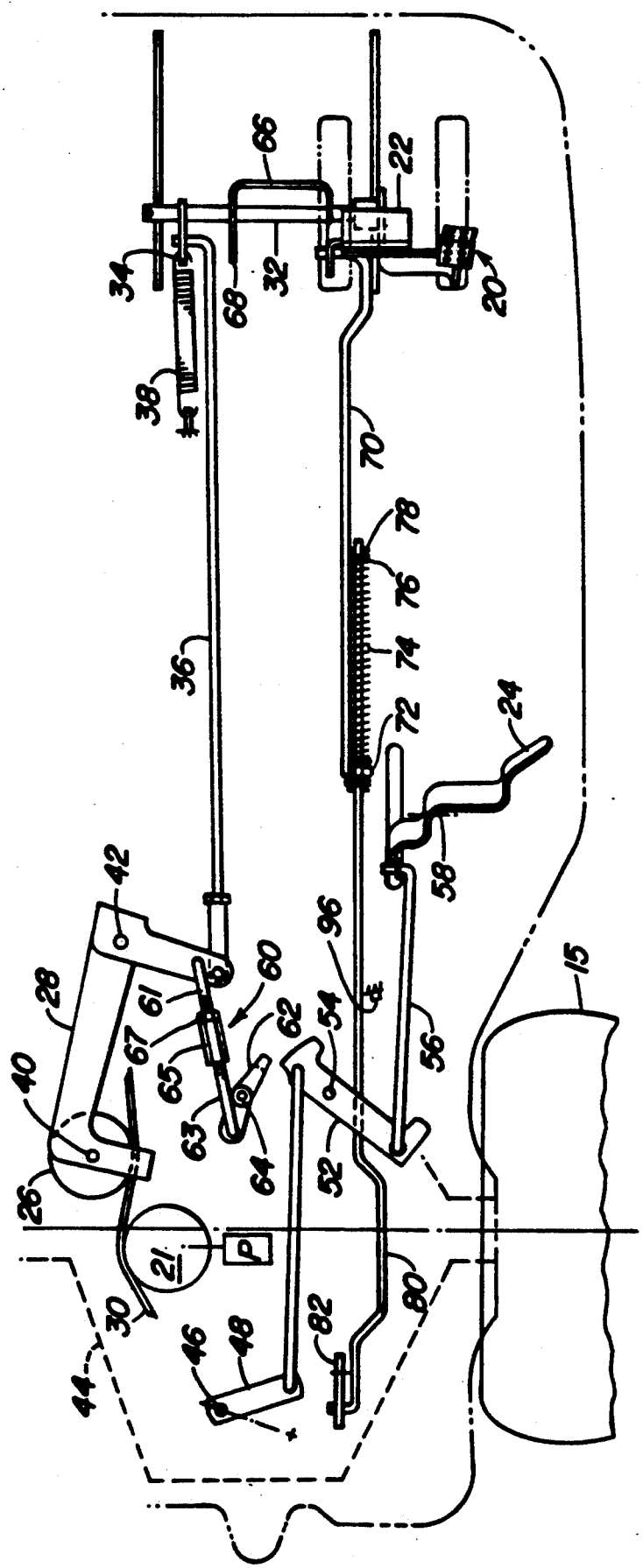
FIG. 4 is a partial overhead view of the present invention, with the accelerator and brake pedal released and the direction control lever in its forward mode.

The accelerator pedal 20 is positioned to the right of the steering wheel 18 in the operator station 16. The pedal 20 is fixed for rotation with an accelerator shaft 32 that is rigidly connected to an accelerator arm member 34, as shown in FIG. 4. The accelerator arm 34 is swingably attached to an accelerator rod 36 and biased to swing rearwardly by means of a spring 38 fixed to the frame 12. The accelerator rod 36 extends rearwardly and is swingably connected to the swingable idler arm 28. The idler arm 28 carries the swingable idler pulley 26 on a shaft 40 and is swingably supported by the frame 12 by a shaft 42.

The transmission 44 is located between the vehicle's rear wheels 15 and has a mode selection shaft 46 whose position determines whether the transmission 44 is in a forward or reverse mode. A mode arm 48 is rigidly connected to the mode selection shaft 46 and is swingably coupled with one end of a first selection rod 50. The other end of the first selection rod 50 is swingably connected to a selection arm member 52 which is swingably connected to the frame 12 by a shaft 54. A second selection rod 56 connects the selection arm 52 to the hand actuated direction control lever 24. The direction control lever 24 is swingably fixed to the frame 12 by a pin member 58.

Swingably attached to the idler arm 28 is a connecting rod or interlock rod 60 comprised of front and rear rod members 61, 63 whose adjacent ends are threaded in opposite directions. A threaded adjusting member 65 couples the front and rear rods 61, 63 together. The adjusting member 65 can be rotated to adjust the length of the interlock rod 60 to accommodate for manufacturing tolerances and belt wear. A jam nut 67 is also threaded on the front rod member 61 in abutment with the adjusting member 65 to prevent the adjusting member 65 from rotating due to vibrations of the vehicle. The interlock rod 60 extends rearwardly to swingably couple itself to a connecting arm or interlock pawl 62. The interlock pawl 62 is swingably fixed to the frame 12 by a pin member 64.

Figure 2:
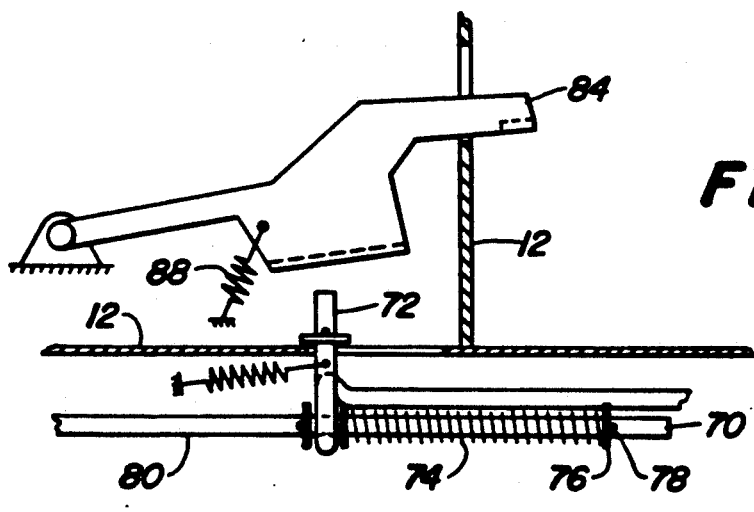
FIG. 2 is a side view of the parking brake lever mechanism in its disengaged mode.

The brake pedal 22 of the preferred embodiment is positioned to the right of the steering wheel 18 but to the left of the accelerator pedal 20. The brake pedal 22 extends downwardly to form a U-shaped portion 66 which is rotatably mounted on the accelerator shaft 32. A cam 68 is formed on one end of the U-shaped portion 66. A front brake rod 70 having a rear upturned portion 72 is swingably connected to the brake pedal 22 above the accelerator shaft 32 and is coupled to a rear brake rod 80 via a spring 74, washer 76 and pin 78. The rear brake rod 80 is connected to a brake arm 82 whose position controls the braking of the vehicle. A parking brake lever 84 protrudes from the frame 12 through an inverted J-shaped slot 86, as shown in FIG. 1. The parking brake lever 84 is swingably mounted to the frame 12 at its rearward end and is biased downwardly by a spring 88 mounted to the frame 12, as shown in FIG. 2.

Figure 10:
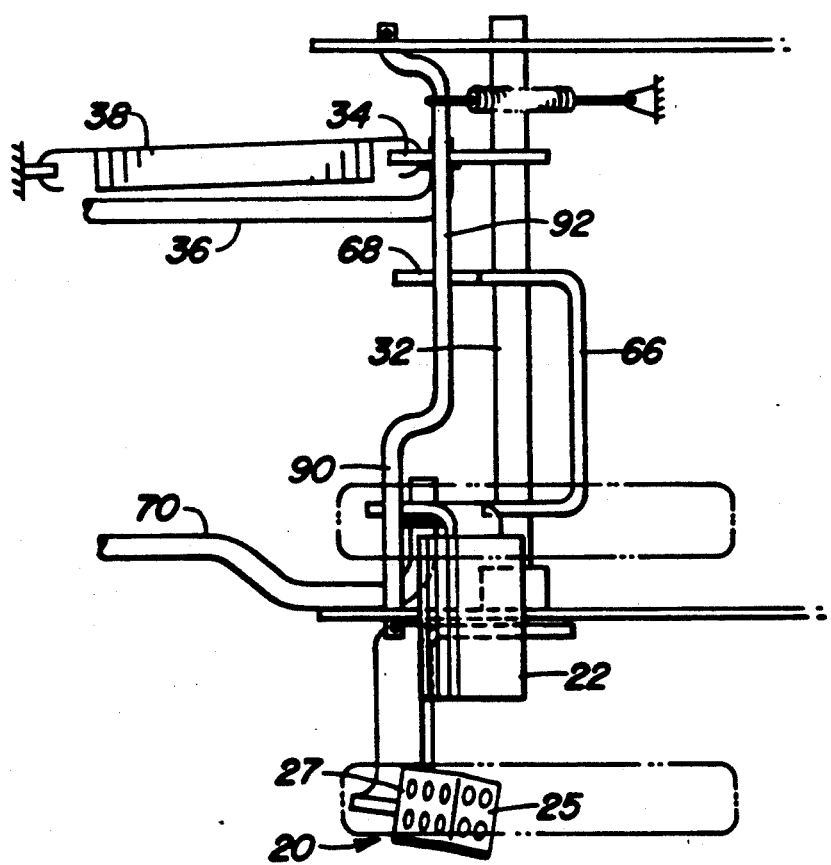
FIG. 10 is an overhead view of the stop rod with the accelerator and brake pedals in released positions.

A stop rod 90, shown in FIGS. 7,8 and 10, is rotatably mounted to the frame 12 above and behind the accelerator shaft 32. The stop rod 90 has an offset portion 92 that is offset from the stop rod's axis of rotation and that rides on the cam 68 formed in the U-shaped portion 66 of the brake pedal 22. A spring 94 mounted to the frame 12 biases the stop rod 90 to rotate clockwise as the brake pedal 22 is depressed.

Next, the operation of the present invention will be explained. To initiate forward progress of the vehicle, the operator depresses the accelerator pedal 20 with his foot. The accelerator pedal 20 is thereby caused to swing forwardly, and the accelerator shaft 32 and accelerator arm member 34 rotate therewith against the force of the spring 38. The movement of the accelerator arm member 34 causes the accelerator rod 36 to shift forwardly. The accelerator rod 36 thereby pulls on the idler arm 28, causing the arm 28 to swing in a counterclockwise manner, as viewed in FIG. 6. This causes the swingable idler pulley 26 fixed to the idler arm 28 to apply tension to the belt 30, which causes the variator to be adjusted to an increased speed setting. As the idler arm 28 rotates counterclockwise, the interlock rod 60 thereattached is pulled forwardly, causing the interlock pawl 62 to swing in a clockwise direction. When the interlock pawl 62 is in a position corresponding to the accelerator pedal 20 being depressed, the presence of the interlock pawl 62 blocks the movement of the selection arm 52 such that the operator can not shift the direction control lever 24 between the forward and reverse modes. The operator is thereby prevented from shifting the vehicle between forward and reverse when he is depressing the accelerator pedal 20 with his foot.

Once the operator takes his foot off of the accelerator pedal 20 he can move the direction control lever 24 to its reverse position. The operator does this by pulling rearwardly on the direction control lever 24, which causes the second selection rod 56 to be pulled forwardly. The second selection rod 56 thereby causes the selection arm 52 to rotate counterclockwise, which pushes the first selection rod 50 rearwardly. The first selection rod 50 thus causes the mode arm 48 to swing clockwise and to thereby rotate the mode selection shaft 46 to its reverse mode. Once the operator has moved the direction control lever 24 to its reverse position, the operator must depress the accelerator pedal 20 to propel the vehicle rearwardly. As the accelerator 20 is depressed, the accelerator rod 36 swings the idler arm 28 counterclockwise to increase the reverse speed. The interlock rod 60 moves forwardly with the idler arm 28, causing the interlock pawl 62 to rotate clockwise. The range of movement of the interlock pawl 62 is limited by the presence of the selection arm 52 in its reverse mode, and the range of movement of the idler arm 28 is thereby also limited. By limiting the range of movement of the interlock pawl 62 during the reverse mode, the speed of the vehicle is limited in reverse. In the preferred embodiment the operator can only achieve a reverse speed equal to about half the maximum speed attainable in the forward direction. A stud 96 welded to the frame abuts the selection arm 52 in its reverse mode and acts to prevent the selection arm 52 from rotating further in a counterclockwise direction when the operator depresses the accelerator pedal 20 with a heavy force of his foot. Also, the operator is prevented from shifting from the reverse to the forward mode when he is depressing the accelerator pedal 20 since movement of the shift control arm 52 is blocked by the interlock pawl 62.

When the operator lifts his foot from the accelerator pedal 20 to slow or stop the vehicle, the accelerator rod 36 shifts rearwardly under the force of the spring 38, and the idler arm 28 swings in a clockwise manner to a position where no tension is placed on the belt 30. As the idler arm 28 swings clockwise the interlock rod 60 is pushed rearwardly, which swings the interlock pawl 62 counterclockwise. In this configuration the interlock pawl 62 is not in a position to block the movement of the selection arm 52. Thus, the direction control lever 24 can be shifted between forward and reverse only when the accelerator pedal 20 is released.

Referring to FIG. 4, the accelerator pedal 20 there shown is in a released position and the direction lever 24 is in the forward position. The idler arm 28 is in an extreme clockwise position wherein the idler pulley 26 is not tensioning the belt 30, and the wheels 15 are not being driven. The interlock pawl 62 as shown is in its extreme counterclockwise position, which would allow the selection control arm 52 to swing between its forward and reverse positions. The position of the interlock pawl 62 as shown would therefore permit the direction control lever 24 to be moved from the forward position as shown to its reverse position.

Figure 5:
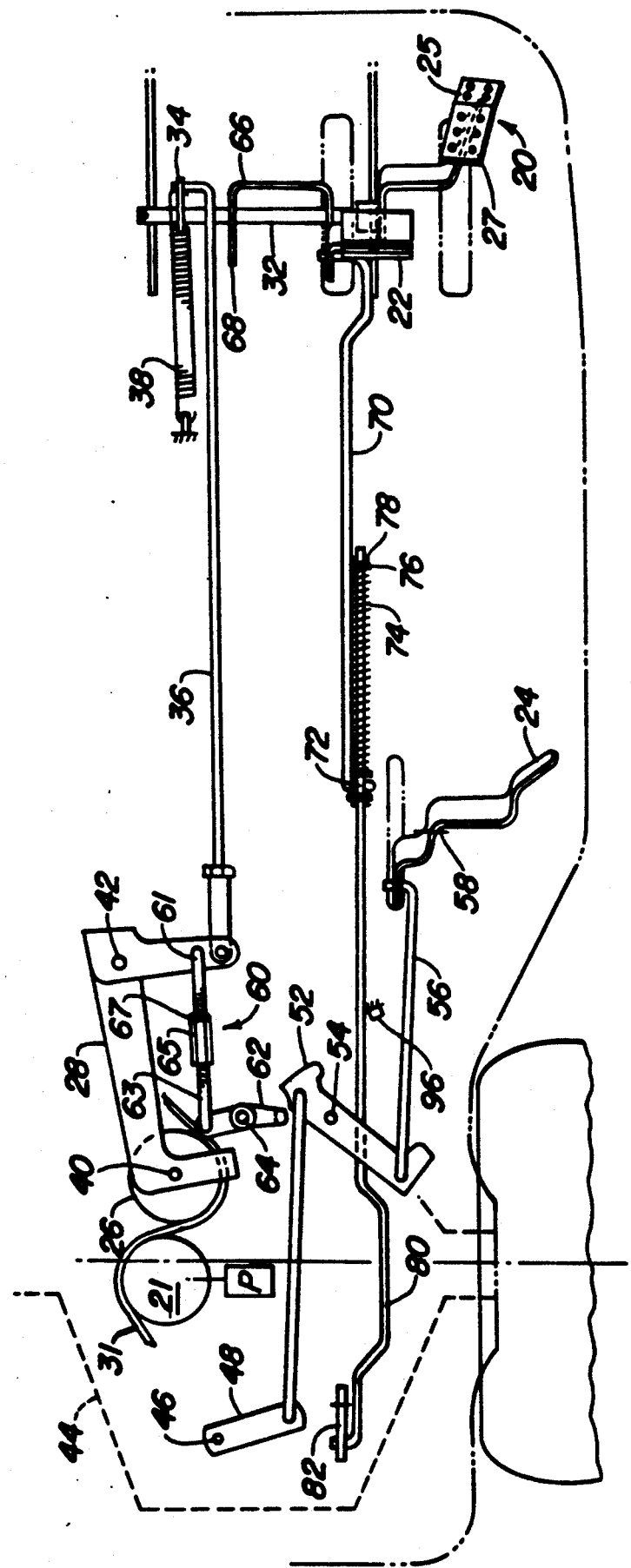
FIG. 5 is a partial overhead view of the present invention, with the accelerator pedal depressed, the brake released and the direction control lever in its forward mode.

FIG. 5 illustrates the present invention when the accelerator 20 is engaged and the direction control lever 24 is in its forward mode. The idler arm 28 is in an extreme counterclockwise position corresponding to the accelerator pedal 20 being depressed. Power is therefore being transferred to the wheels 15 from the power source via the variator pulley mechanism. The interlock rod 60 has been pulled forwardly by the idler arm 28 and has swung the interlock pawl 62 to an extreme clockwise position. The position of the interlock pawl 62 as shown blocks the selection arm 52 from pivoting and the operator is therefore prevented from shifting the direction control lever 24 from forward to reverse mode.

Figure 6:
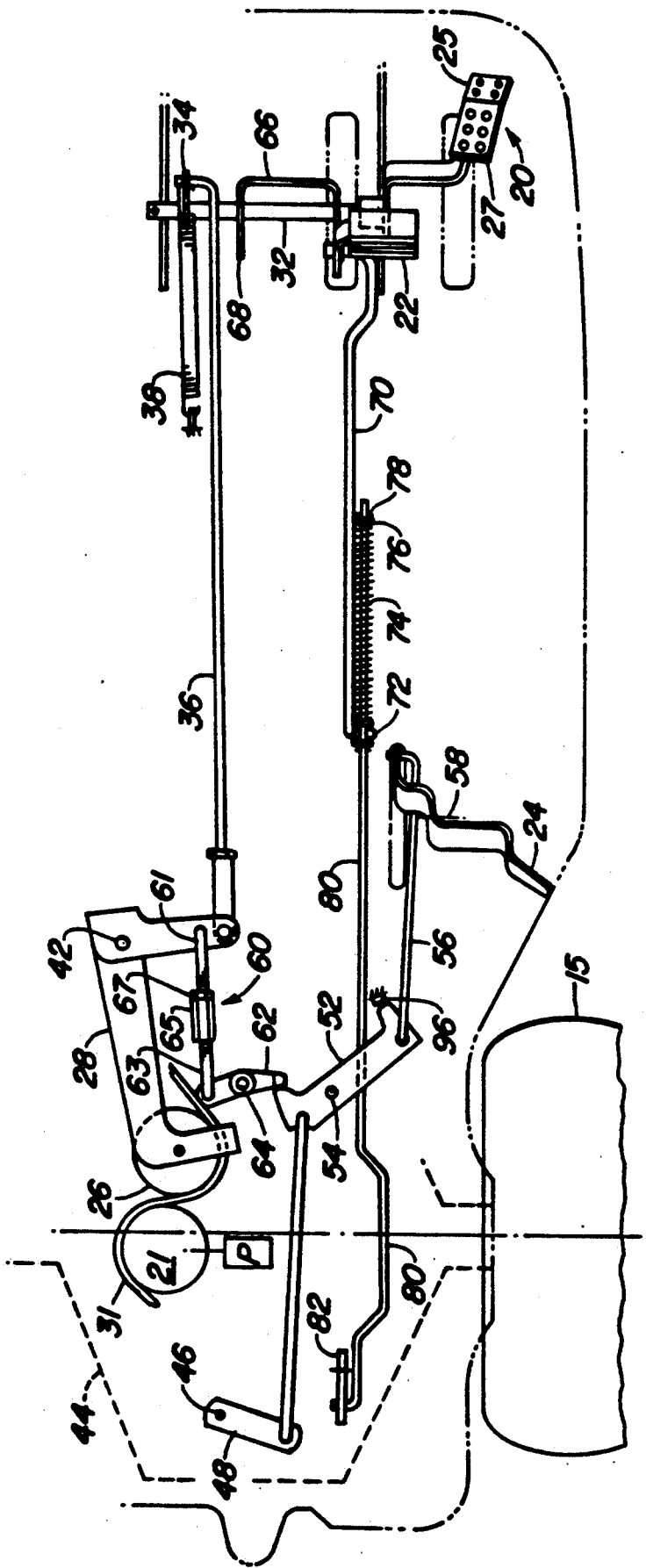
FIG. 6 is a partial overhead view of the present invention, with the accelerator pedal depressed and the brake pedal released and the direction control lever in its reverse mode.

FIG. 6 illustrates the present invention when the accelerator pedal 20 is engaged and the direction control lever 24 is in its reverse mode. The selection arm 52 is in an extreme counterclockwise position and the first selection rod 50 has been displaced rearwardly, thereby pivoting the mode arm 48 rearwardly to its reverse position. The interlock pawl 62 has been displaced to an extreme clockwise position such that it is in contact with the selection arm 52. The selection arm 52 as shown in the reverse mode acts to block the interlock pawl 62 from rotating further in the clockwise direction. The idler arm 28 is prevented from rotating further in the counterclockwise direction because it is linked to the interlock pawl 62 by the interlock rod 60. The idler arm 28 and swingable idler pulley 26 are prevented from further tensioning the belt 30. The speed of the vehicle is thereby limited when driving in the reverse direction.

Referring now to FIGS. 7 and 8, there is shown side views of the preferred embodiment of the accelerator pedal 20. This pedal assumes an angled form and includes first and second surfaces 25, 27. As seen in FIGS. 7-9, the second surface extends at a relatively small angle from the plane defined by the first surface. When the operator wishes to drive the mower he begins to depress the accelerator pedal 20. In doing so, the toe portion or ball of the operator's foot comes in contact with the upper portion 25 of the accelerator pedal 20. As he depresses the pedal 20 further the pedal 20 continues to rotate until the middle or lower portion of the operator's foot comes in contact with the lower portion 27 of the accelerator pedal. Since the lower portion 27 of the accelerator pedal 20 forms an angle with the upper portion 25, the operator's ankle rotates his foot through a smaller arc when manipulating the pedal than if the pedal 20 were flat. The angle in the accelerator pedal 20 therefore allows the operator's foot to assume a comfortable angle with respect to his lower leg throughout the accelerator pedal's full range of movement without requiring him to lift his heel from the floor of the operator station. As seen in FIGS. 7-9, the rotatable accelerator shaft 32 is positioned at a location offset from the planes defined by the first and second surfaces.

Figure 3:
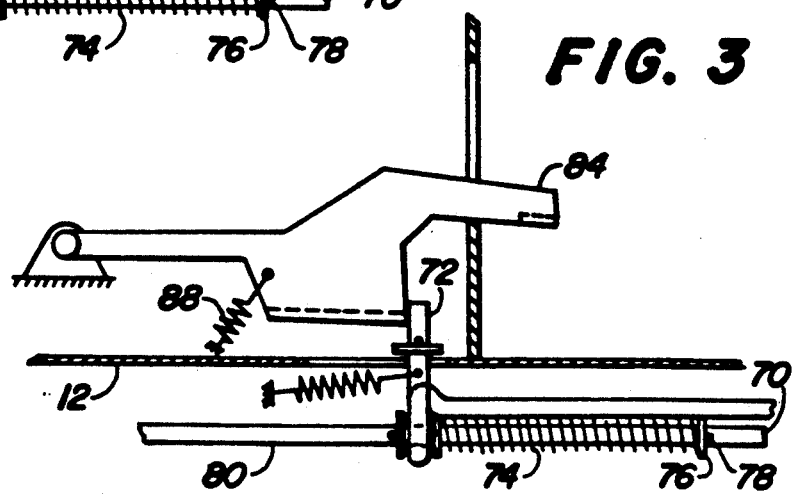
FIG. 3 is a side view of the parking brake lever mechanism in its engaged mode.

When the vehicle has come to a complete stop the operator may wish to engage the parking brake. The operator does this by fully depressing the brake pedal 22, which shifts the front brake rod 70 forwardly (see FIGS. 2 and 3). The operator then shifts the parking brake lever 84 from the upper portion of the inverted J-shaped slot 86 to the lower portion. The parking brake lever 84 is then in abutment with the upturned portion 72 of the front brake rod 70, which keeps the brake pedal 22, the front brake rod 70, and the rear brake rod 80 shifted forwardly. This prevents the brake from being released.

Looking again to FIGS. 7 and 8, it will be seen that when the operator depresses the brake pedal 22, the cam 68 located on the U-shaped portion 66 rotates clockwise. The stop rod 90 abutting the cam 68 is thereby allowed to rotate clockwise under the force of the spring 94. As the stop rod 90 rotates, the offset portion 92 swings downwardly in front of the accelerator arm 34 and blocks forward movement of the arm 34. Since the stop rod 90 blocks the accelerator arm 34 from rotating forwardly the accelerator pedal 20 is prevented from being inadvertently depressed when the parking brake is engaged. The vehicle is thereby prevented from being driven when the parking brake is engaged.

The above preferred embodiment describes the present invention as used with a belt drive mechanism. However, the present invention can be utilized with drive means other than those using belts to transmit power. For example, hydrostatic transmissions and direct drive mechanisms can be employed on a vehicle in cooperation with the present invention.

I claim:

1. A vehicle comprising:
 a plurality of ground engaging wheels including a driven wheel;
 a frame carried by the wheels;
 a power source carried by the frame;
 drive means for transmitting power form the power source to at least one of the ground engaging wheels and having forward and reverse modes;
 first control means for selecting the forward or reverse mode;
 second control means for adjusting the rate at which power is transferred through the drive means to the driven wheel, said second control means being adapted for a non-driving mode and a plurality of driving modes, said second control means being adjustable in a first direction to be shifted from the non-driving mode to the driving modes when the first control means is in either the forward or reverse modes, said second control means being adjustable in a second direction opposite to the first direction for shifting the second control means from the driving modes to the non-driving mode when the first control means is in either the forward or the reverse mode; and means for connecting the first control means and the second control means, said connecting means being adapted to prevent the drive means' mode from being changed when the second control means is in a driving mode, said connecting means also being adapted to limit the maximum rate of power transferred in reverse mode to a rate less than the maximum rate attainable in the forward mode.

2. The invention as defined in claim 1 wherein:
the means for connecting the first control means and the second control means is adapted to prevent the drive means' mode from being changed when the second control means is in a driving mode, and is also adapted to limit the number of driving modes that the second control means can select when the first control means is in the reverse mode to a number less than that selectable in the forward mode.

3. The invention as defined in claim 1 and further comprising:
means for biasing the second control means toward the non-driving mode.

4. The invention as defined in claim 1 further comprising means for braking the vehicle, said means being adapted for being shifted between unbraked, braked and parked mode; and
means coupling the second control means with the brake means for preventing the second control means from being shifted from the non-diving mode to a driving mode when the brake means is in its parked mode.

5. The invention as defined in claim 1 wherein the second control means further includes a foot actuated pedal.

6. The invention as defined in claim 5 wherein the foot actuated pedal has initial and secondary ranges of motion and further comprises a first surface engageable with the foot of the operator as the pedal is in its initial range of motion; and
a second surface positioned at an angle to the first surface and engageable with the operator's foot as the pedal is in its secondary range of motion.

7. The invention as defined in claim 1 wherein the second control means further comprises:
input means for adjusting the amount of power transmitted to the wheels;
a control rod connected to the input means;
and a foot actuated pedal connected to the control rod.

8. The invention as defined in claim 7 wherein the first control means further comprises a first selection rod connected with the drive means and whose position affects the forward or reverse mode;
a swingable selection arm connected to the first selection rod;
a second selection rod connected to the selection arm; and
a hand actuated direction lever connected to the second selection rod.

9. The invention defined in claim 8 wherein the connecting means further comprises a connecting rod attached to the input means; and a connecting arm means swingably attached to the connecting rod for blocking the movement of the selection arm between the positions corresponding to the forward and reverse modes when the foot pedal is depressed, and whose range of movement is restricted by the presence of the selection arm when the selection arm is in a position corresponding to the drive means' reverse mode.

10. The invention as defined in claim 10 wherein the connecting means further comprises a connecting rod attached to the idler arm; and
a connecting arm swingably attached to the connecting rod, said connecting arm being adapted to block movement of the selection arm between the positions corresponding to the forward and reverse modes when the foot pedal is depressed, and whose range of movement is restricted by the presence of the selection arm when the selection arm is in a position corresponding to the drive means' reverse mode.

11. A foot pedal for use on powered vehicles driven by an operator, comprising
a rotatable shaft whose position determines the speed of the vehicle, and having initial and secondary ranges of rotation;
a first generally planar surfaced member connected with the shaft and engagable with the fort of the operator as the shaft is in its initial range of rotation; and
a second generally planar surfaced member connected with the shaft, and whose surface is positioned at a relatively small angle to the plane of the first surfaced member and engagable with the operator's foot as the shaft is in its secondary range of rotation, said rotatable shaft being offset from the plane defined by the second surface.

12. The invention as defined in claim 11 wherein the first surfaced member is adapted for engagement with the ball of the operator's foot as the shaft is in its initial range of rotation; and
the second surfaced member is adapted for engagement with the middle of the operator's foot as the shaft is in its secondary range of rotation.

13. The invention of claim 1 wherein the connecting means further comprises:
a swingable selection arm member coupled with the first control means for swinging between forward and reverse positions as the first control means is adjusted between respective forward and reverse modes;
a swingable connecting arm means coupled with the second control means for swinging between a non-driving position, a range of driving positions corresponding to a low rate of power transfer, and a range of driving positions corresponding to a high rate of power transfer as the second control means is adjusted between respective non-driving and driving modes;
said connecting arm means being positioned adjacent the selection arm member for blocking the selection arm member from swinging between the forward and reverse positions when the connecting arm means is in a driving position, and for allowing the selection arm member to swing between forward and reverse positions when the connecting arm means is in the non-driving position; and
said selection arm member being positioned adjacent the connecting arm means for blocking the connecting arm means from swinging to the range of driving positions corresponding to a high rate of power transfer when the selection arm member is in the reverse position.

14. A vehicle comprising:
a plurality of ground engaging wheels including a driven wheel;
a frame carried by the wheels;
a power source carried by the frame;
drive means for transmitting power form the power source to at east one of the ground engaging wheels and having forward and reverse modes;
first control means for selecting the forward or reverse mode;
second control means for adjusting the rate at which power is transferred through the drive means to the driven wheel, said second control means being adapted for a non-driving mode and a plurality of driving modes; and
means for connecting the first control means and the second control means, said connecting means being adapted to prevent the drive means' mode from being changed when the second control means is in a driving mode, said connecting means also being adapted to limit the maximum rate of power transferred in reverse mode to a rate less than the maximum rate attainable in the forward mode;
said second control means further including:
input means for adjusting the amount of power transmitted to the wheels;
a control rod connected to the input means; and
a foot actuated pedal connected to the control rod;
said first control means further including:
a first selection rod connected with the drive means and whose position affects the forward or reverse mode;
a swingable selection arm connected to the first selection rod;
a second selection rod connected to the selection arm;
a hand actuated direction lever connected to the second selection rod;
said connecting means further including:
a connecting rod attached to the input means; and
a connecting arm means swingably attached to the connecting rod for blocking the movement of the selection arm between the positions corresponding to the forward and reverse modes when the foot pedal is depressed, and whose range of movement is restricted by the presence of the selection arm when the selection arm is in a position corresponding to the drive means' reverse mode.

15. A vehicle comprising:
a plurality of ground engaging wheels including a driven wheel;
a frame carried by the wheels;
a power source carried by the frame;
drive means for transmitting power form the power source to at least one of the ground engaging wheels and having forward and reverse modes;
first control means for selecting the forward or reverse mode;
second control means for adjusting the rate at which power is transferred through the drive means to the driven wheel, said second control means being adapted for a non-driving mode and a plurality of driving modes; and
means for connecting the first control means and the second control means, said connecting means being adapted to prevent the drive means' mode from being changed when the second control means is in a driving mode, said connecting means also being adapted to limit the maximum rate of power transferred in reverse mode to a rate less than the maximum rate attainable in the forward mode;
said second control means further including:
input means for adjusting the amount of power transmitted to the wheels;
a control rod connected to the input means; and
a foot actuated pedal connected to the control rod;
said first control means further including:
a first selection rod connected with the drive means and whose position affects the forward or reverse mode;
a swingable selection arm connected to the first selection rod;
a second selection rod connected to the selection arm;
a hand actuated direction lever connected to the second selection rod;
said drive means further including:
a plurality of belts;
a variator pulley in contact with a belt; and
an idler pulley in contact with a belt;
said input means further including an idler arm that carries the idler pulley;
said connecting means further including:
a connecting rod attached to the idler arm; and
a connecting arm swingably attached to eh connecting rod, said connecting arm being adapted to block movement of the selection arm between the positions corresponding to the forward and reverse modes when the foot pedal is depressed, and whose range of movement is restricted by the presence of the selection arm when the selection arm is in the position corresponding to the drive means' reverse mode.

16. A foot pedal for use near the floor of an operator station of a powered vehicle driven by an operator, comprising:
a rotatable shaft whose position determines the speed of the vehicle, and having initial and secondary ranges of rotation;
a first generally planar surface defined by the pedal, said first surface being in contact with the ball portion of the operator's foot during the initial range of motion while the heel of the operator's foot is in contact with the floor of the operator station,
a second generally planar surface defined by the pedal and extending at a relatively small angle from the plane defined by the first surface, said second angle being in contact with the middle portion of the operator's foot when the operator shifts his foot forwardly to pivot the shaft to the secondary range while the heel of the operator's foot remains in contact with the floor of the operator station, and said rotatable shaft being offset from the plane defined by the second surface.

* * * * *

UNITED STATES PATENT AND TRADEMARK OFFICE
CERTIFICATE OF CORRECTION

PATENT NO. : 5,136,899

DATED : August 11, 1992

INVENTOR(S) : John J. Hoch et al.

It is certified that error appears in the above-identified patent and that said Letters Patent is hereby corrected as shown below:

Col. 8
Claim 1, line 6, delete "form" and insert therefore --from--.
Col. 9,
Claim 7, line 3, after "means" insert -- coupled to the drive means --.
Col. 10,
Claim 10, line 1, delete "10" and insert therefore -- 9 --.
Col. 10,
Claim 11, line 7, delete "fort" and insert therefore -- foot --.
Col. 11,
Claim 14, line 6, delete "form" and insert therefore -- from --; line 7, delete "east" and insert therefore -- least --.

Col. 11, claim 15, line 6, delete "form", and insert --from--
Col. 12, line 35, delete "eh"  should read --the--

Col. 12, claim 16, line 16, delete "angle" should read --surface--.

Signed and Sealed this

Fifth Day of October, 1993

*Attest:*

BRUCE LEHMAN

*Attesting Officer*   Commissioner of Patents and Trademarks